Nov. 20, 1945.  M. C. SMOTZER  2,389,463
PIPE CUTTING MACHINE
Filed Jan. 24, 1944  3 Sheets-Sheet 1
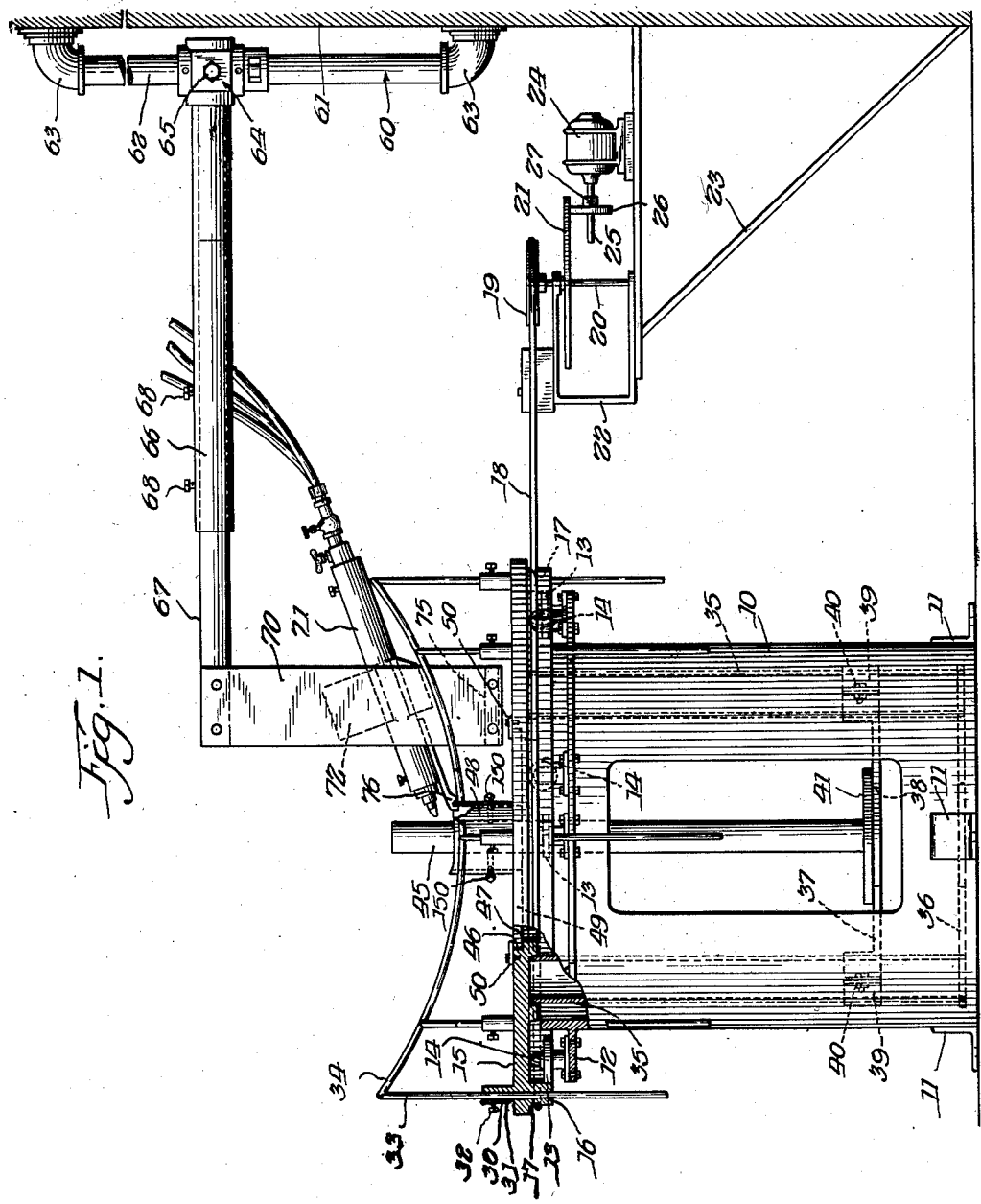
Inventor:
Michael C. Smotzer:
By Wilkinson Huxley, Byron, & Knight
Attys.

Nov. 20, 1945.  M. C. SMOTZER  2,389,463
PIPE CUTTING MACHINE
Filed Jan. 24, 1944  3 Sheets-Sheet 2
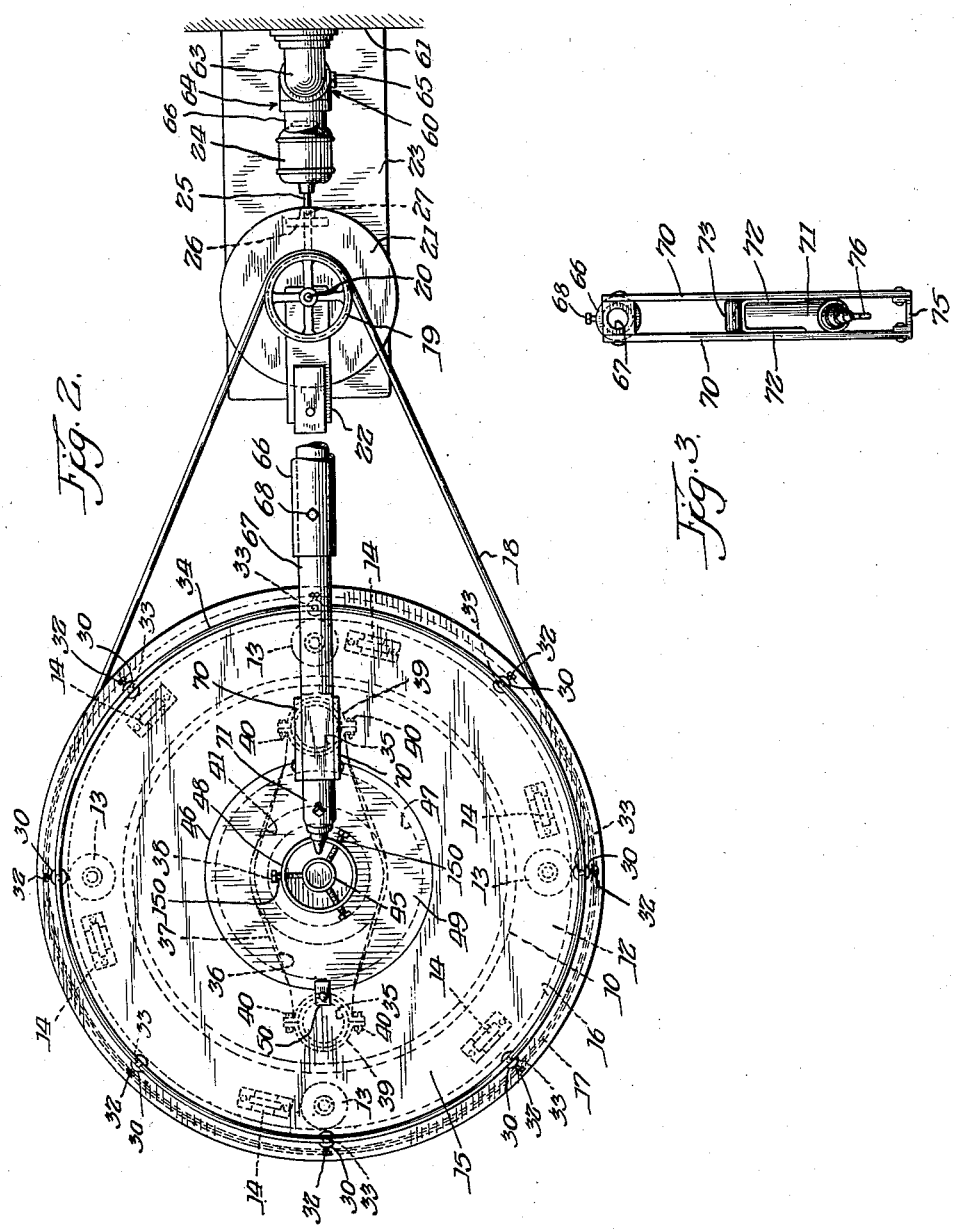
Inventor:
Michael C. Smotzer
By Wilkinson, Huxley, Byron, & Knight
Attys Nov. 20, 1945.     M. C. SMOTZER     2,389,463
PIPE CUTTING MACHINE
Filed Jan. 24, 1944     3 Sheets-Sheet 3

Inventor:
Michael C. Smotzer
By Wilkinson, Huxley, Byron & Knight,
Attys.

Patented Nov. 20, 1945

2,389,463

UNITED STATES PATENT OFFICE 2,389,463

PIPE-CUTTING MACHINE

Michael C. Smotzer, Oak Park, Ill., assignor to James B. Clow & Sons, Chicago, Ill., a corporation of Illinois Application January 24, 1944, Serial No. 519,579

5 Claims. (Cl. 266—23)

This invention relates to a new and useful machine for holding and directing a tool with relation to the work to be processed by such tool, and automatically imparting to such tool a predetermined varied path of movement with respect to said work and of automatically altering the direction of said tool whereby its action may be exerted in a predetermined and varied manner.

The invention is here illustrated as embodied in an automatic pipe or tube cutting machine which is particularly adapted for cutting pipes or producing segments going into and making up pipe intersections or junctions of a wide variety of shapes and sizes, and which employs a gas cutting torch as the tool which is automatically moved and directed. It is to be understood, however, that the machine of this invention is equally applicable to combinations employing other tools which may likewise be moved in a varied path for adjustment to various contours of work and automatically directed to exert an effect in different angular directions.

It is an object of this invention to provide a machine which will automatically move and direct a tool with respect to work as the work and the tool move relative to each other, so that the effect of the tool will be exerted in any predetermined variable path and at the same time automatically exert is effect in any predetermined variable direction with respect to the work.

It is a further object of this invention to provide a machine of the type referred to, which is particularly adapted for automatically cutting pipes or tubes in any desired shape along any particular varied path, and simultaneously to provide any desired bevel on the edge of the pipe segment resulting from the cutting operation.

In the manufacture of pipe intersections or junctions a wide variety of different shapes must be cut on the edge of the branch pipe so as to make it conform and fit to the edge of the opening provided in the pipe to which it is joined. It is apparent that the required shape will vary with the dimensions of the two pipes, respectively, and also the angularity of the junction between the pipe segments and the cross sectional shape of the pipes themselves. For instance, particular shapes of edge cuts are required when an oval shaped pipe is joined at an angle to a pipe having a circular cross section, and the shape will be varied if the angularity is changed or if the dimensions of one or the other of the pipe segments is different. Furthermore, in producing welded pipe, it is necessary to provide a bevel on the edge of the branch pipe for accommodating metal constituting the welding seam. A proper welded joint necessitates a variation of the bevel on the edge of the pipe throughout its circumference to provide a uniform angular recess to accommodate the welding seam metal throughout the circumference of the joint.

As far as this applicant knows, no machine has been provided prior to this invention which will automatically cut pipe or tube edges throughout their circumference on any desired contour or path irrespective of the cross-sectional shape of the pipe, and at the same time vary the direction of the cutting tool to automatically provide a variable bevel as may be desired in any particular instance.

Accordingly, it is a further object of this invention to provide a machine which will automatically accomplish this result by simple and effective procedure, which is not difficult to control or practice, and which at the same time is relatively inexpensive to produce as well as to operate and maintain.

These and other objects not specifically enumerated are contemplated for this invention, as will readily appear to one skilled in the art as the following description proceeds. In the following description reference will be made to the accompanying drawings, in which—

Figure 1 is a side elevational view of a machine built in accordance with the present invention, which is particularly designed to accommodate a gas-operated cutting torch and which is designed particularly for cutting pipes for producing segments for pipe intersections or junctures.

Figure 2 is a plan view of the machine illustrated in Figure 1.

Figure 3 is an end view of the tool holder shown in Figure 1, as seen from the left-hand side of the view illustrated in Figure 1.

Figure 4:
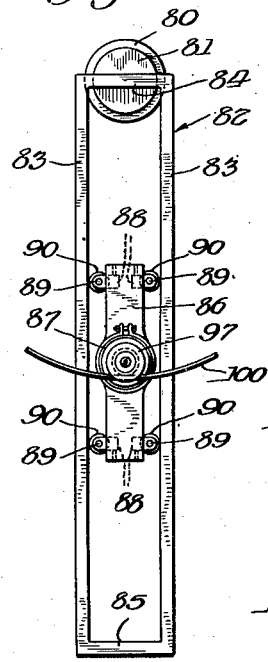
Figure 4 is a view similar to Figure 3 illustrating a modified form of the invention.

By referring to the drawings, it will be noted that the machine here illustrated comprises a pedestal 10 which may be of any suitable construction and which is here illustrated as comprising an upstanding cylindrical support having a plurality of feet 11 attached to the base thereof for securing the same to the floor or other surface, and having an outstanding flange or shelf 12 adjacent the top thereof. Mounted on the flange 12 are a plurality of rollers 13 which are suitably bolted to the flange and which are mounted for rotation on vertical axes. As shown in Figure 2, four of these rollers are provided in the illustrated form. Also mounted on the flange 12 are a plurality of rollers 14 which are suitably bolted to the flange and which are mounted for rotation on horizontal axes. As shown in Figure 2, six of the horizontally mounted rollers 14 are provided, equally spaced throughout the circumference of the machine.

Mounted on top of the rollers 14 so as to be supported thereon is a rotatable table 15 which is provided adjacent its outer edge with a depending flange 16 which extends downwardly so as to present its inner surface in engagement with the vertically mounted rollers 13. It will be apparent that table 15 is thus supported for rotation and is held against lateral displacement.

On the outside of the depending flange 16 a belt-receiving groove 17 is preferably provided in which is mounted a belt 18 which extends to one side of the table and engages the driving pulley 19. The driving pulley 19 is mounted on the vertical spindle 20, to which is fixed the driving disc 21. This driving mechanism is suitably held by a frame 22 mounted on a suitable support 23 which also serves as a mounting for the electrical driving motor 24. The motor shaft 25 has adjustably mounted thereon friction driving wheel 26 which is adapted to frictionally engage the under surface of the disc 21 so as to impart rotary motion to it and, in turn, drive the table 15. Friction wheel 26 is capable of being adjusted along the length of the shaft by means of a holding screw 27, whereby the speed of the table may be varied as desired in any particular case.

Mounted upon the upper surface of the table 15 are a plurality of upstanding collars 30 which are either attached to the table or made integral therewith, and through each of which is provided an opening 31 which extends downwardly through the collar, through the table, and through the depending flange 16. A holding screw 32 is provided in each collar which is adapted to engage and hold in any adjusted position the upstanding guide supporting rods 33. The guide supporting rods are of sufficient length to be adjusted to any desired position so that such rods collectively may serve as supports spaced around the circumference of the table, for the guide or template 34. The guide 34 may be made of metal which is capable of being bent or deformed, and it may be made integral with the supporting rods 33 or connected thereto by any suitable type of joint or connection. The essential aspect of this part of the machine is that the supports 33 are capable of being adjusted up and down so as to give the guide 34 any desired predetermined contour or shape, for the purpose hereinafter more fully set forth.

Attached to the underside of the table 15 are a plurality of depending posts or supports 35 which extend downwardly inside of the cylindrical base 10. In the present illustration, two such supports are provided which are diametrically disposed and which are connected at their base by a cross brace 36 which is rigidly secured thereto. The depending posts 35 form supports for an adjustable table 37 which has a central opening 38 therein and end clamping members 39—39 cooperating with the semi-cylindrical end portions thereof. The clamping members 39—39 are held by means of suitable nuts and bolts 40 which extend through the wings of the clamping parts, as shown in Figure 2, whereby the table 37 is adjustably supported on the depending posts 35. In certain instances a plate 41 will be provided over the hole 38 in the table 37 so as to serve as a support for the length of pipe 45 being processed by the machine.

The table 15 is further provided with an opening 46 having a shoulder 47 provided therein which accommodates and supports the base 49 of the template 48. Suitable clamps 50 are mounted on the top of the table for holding the template against rotary movement relative to the table.

In addition to the foregoing, a suitable bracket or member 60 is provided to one side of the base 10, mounted on a suitable surface such as a wall 61 or any upright supporting member, which in the illustrated form comprises a vertical bar 62 held by angle members 63—63 and on which is adjustably mounted a supporting bracket 64. Bracket 64 is preferably equipped with suitable clamping means, such as the holding screw 65, for holding the bracket in any adjusted position. Extending outwardly from the bracket 64 is a horizontally disposed supporting member 66, which in this illustration is a portion of a pipe in which is slidably mounted a second pipe 67 which may be held in any adjusted position by means of the holding screws 68.

On the outer end of the pipe 67 are a pair of depending plates 70—70 which are spaced apart a distance sufficient to accommodate the particular tool to be used with the machine, which in this illustration is a gas-operated cutting torch 71. Furthermore, guide plates 70—70 are preferably spaced at their bottoms by suitable spacing members 75 riveted or otherwise secured thereto. Torch 71 is of usual construction insofar as its internal design and mechanism are concerned, but as distinguished from the usual torch it is provided with lateral bearing plates 72—72 which are preferably connected at their tops and bottoms by cross members 73. The cutting torch is further modified to the extent of including a supporting member 76 which is rigidly attached to the tool and which has a hook-like formation at its outer end adapted to engage and receive support from the upper edge of the template 48.

It is to be noted particularly that the cutting torch, though held for movement in a vertical plane by the guide plates 70—70, is otherwise bodily movable within the vertical plane and is supported through the hook-like member 76 on the edge of the template at one end and by engagement with the guide 34 at a point spaced therefrom and adjacent the rear of the cutting torch. It will further be noted that the cutting torch is free to move bodily toward and away from the axis of the rotating table, as well as to move bodily up and down in the plane which it occupies between the guide plates 70—70. Furthermore, the torch is free to assume any angular position in the particular plane which it occupies, as may result by any variation in the relative heights of the particular portions of the template and guide, respectively, on which the tool may be supported at any particular moment. For instance, if the template should be relatively high and the guide relatively low on a particular radius of the table, the cutting torch would be inclined upwardly whereby the direction of its cutting flame would be disposed at a corresponding angle. On the other hand, if the guide is substantially higher than the template on any particular radius of the table the direction of the torch would be downwardly to provide a corresponding bevel at the moment the torch was so supported. If, on the other hand, the template and guide should be of equal height on the same radius of the table, it will be apparent that the resulting action of the cutting torch at the moment it was so supported would be directed horizontally and no bevel would result.

Figure 5:
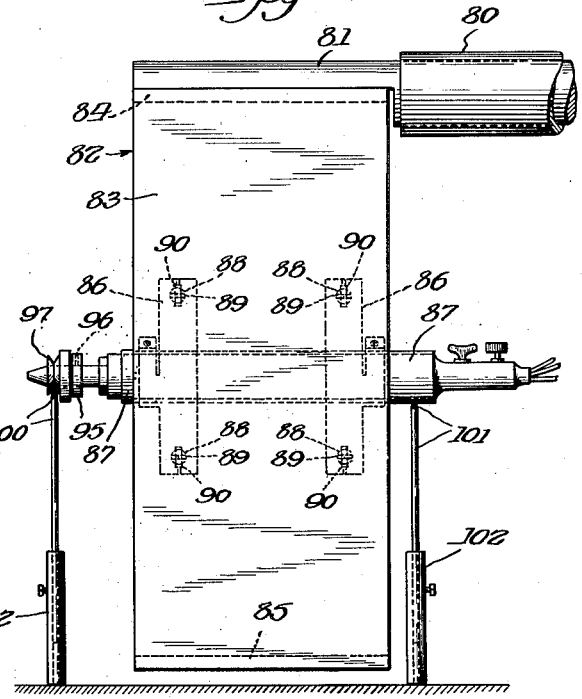
Figure 5 is a side elevational view of the modified form of mechanism shown in Figure 4.

Referring now to the modification shown in Figures 4 and 5, it will be noted that this form of the invention comprises a supporting member 80 and a second supporting member 81 telescopically associated therewith, which correspond to the members 66 and 67, respectively, in the form shown in Figure 1.

Attached to and depending from the supporting member 81 is the holder 82 which comprises a pair of spaced plates 83—83 spaced at the top by a cross brace 84 and at the bottom by a cross brace 85. The spacing of the plates 83—83 is sufficient to accommodate the carriage members 86—86 which are rigidly attached to the cutting torch 87. The carriage members 86 are provided with a plurality of brackets 88 which have spindles 89 that serve as mountings for anti-friction rollers 90. These rollers are adapted to engage the inside faces of the spaced plates 83—83 so as to hold the cutting torch for movement in a single vertical plane.

Two such carriage members 86 are provided, and each has a set of four rollers as described. Accordingly, the torch is free to move up and down and in a manner to assume all angular positions, as previously described in connection with the construction illustrated in Figure 1. Furthermore, the torch with the carriages 86 is also free to move axially of the torch, that is, toward and away from the center of the table, because the carriage members are free to slide on the face of the plates 83—83 in the direction of the axis of the rollers. In actual practice this latter type of movement will not be great and will only occur gradually, and consequently it is of little importance that the rollers are not swiveled or mounted for rotation in all directions.

At the outer end of the cutting torch a collar member 95 is provided having a set screw 96 for fixing the same on the end of the tool in any adjusted relation. This collar serves as an antifriction bearing support for the grooved roller member 97 which rests on and has rolling engagement with the upper edge of the template 100. In this form of the invention the action is substantially the same as that of the form illustrated in Figure 1, except that the movement of the tool or cutting torch is effected through antifriction means. In this form, like in the other form of the invention, the rear end of the tool is supported on a rear guide or template 101 mounted in suitable upstanding supports 102 carried on the top of the table.

Figure 6:
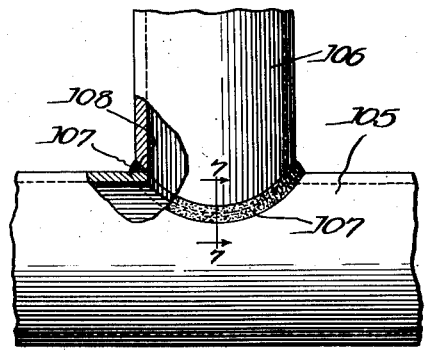
Figure 6 is a side elevational view of a pipe intersection or junction embodying a pipe segment of the type automatically produced by the machine of this invention.

When the machine of this invention is embodied in a pipe cutting mechanism of the type here illustrated, it will be understood that branch pipe sections may be formed having edges of any desired contour and at the same time having the desired bevel thereon for accommodating the weld-seam metal. For instance, in Figure 6 is illustrated a pipe intersection or junction comprising a pipe 105 which has an opening in one side thereof, and a branch pipe segment 106 welded to the first pipe segment closely fitting the opening in the desired manner. The portion of Figure 6 which is broken away discloses the welding metal 107 occupying the space between the joined edge surfaces of the two pipe segments, respectively.

Figure 7:
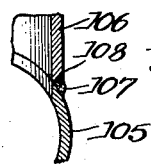
Figure 7 is a detail cross-sectional view taken on the line 7—7 of Figure 6.

It will be noted that a bevel face 108 is provided on the edge of the segment 106 at the location disclosed in the drawings so as to provide the necessary space for welding metal. On the other hand, an inspection of Figure 7 will show that at the portion of the segment 106 which is 90° removed from the bevel 108, no bevel at all is required to provide the space for the weld metal. It will thus be apparent that the character of the bevel must vary as conditions demand throughout the circumference of the edge of the segment 106.

Figure 8:
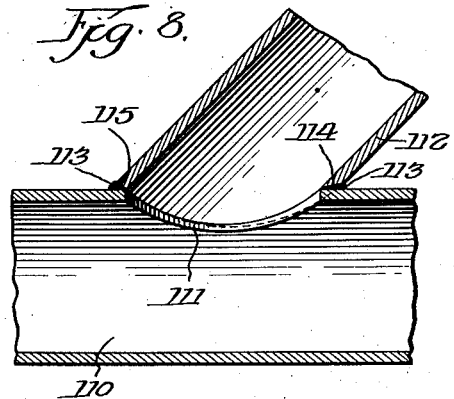
Figure 8 is an elevational cross-sectional view showing a further type of pipe intersection or junction embodying a pipe segment of the type automatically produced by the machine of this invention.

A similar illustration is found in Figure 8, wherein a different type of junction is shown. This junction comprises a pipe segment 110 having an opening 111 and a branch pipe 112. In this instance, the welding metal is shown at 113 and occupies a space provided by a bevel 114 on the right-hand side of the figure and the edge 115 without a bevel at all on the left-hand side of the figure.

In practice, the template may be formed of pipe material having the desired contour on its upper face, as illustrated in Figure 1, or it may be made of a bent rod of the type shown in Figure 5. In operation, it is only necessary to provide the desired template and guide, respectively, and to thereafter place the sections of pipe in proper position on the table and start the operation. The inner template should have the same cross-sectional shape as the pipe or tube being cut, or such slight modification therefrom as will cause the cutting tool to be maintained at all times in proper cutting relation to the surface of the tube being processed. By proper adjustment of the template and guide and the holding action of the tool holder, the operation of the machine causes the tool to follow the contour of the pipe being processed, both as to its spaced relationship thereto and also as to the variable path to be followed by the tool to create the desired edge on the pipe segment being produced.

Furthermore, by the combined action of the template and guide the tool is tilted to any desired position or is held horizontally, as conditions may require, to automatically produce during the cutting operation the desired beveled edge on the tube being cut. With the machine so adjusted, the operation is quick and simple and can be carried out without close supervision or danger of difficulty. As a result, a large number of pipe segments of the same general contour can be produced by repeated operations, whereby the cost of welded pipe junctions is materially reduced.

It is to be understood that the principles of this machine can be applied in other ways, as it is contemplated that the variable control of the tool may be combined with a work table which moves in a straight-line or other path. In all events, the template and guide would be mounted on the table, whereby their relative movement past the tool would impart to it the variable up-and-down, in-and-out, and tilting motions required to give the desired results to the finished work.

As previously mentioned, the tool may be of any desired type which lends itself to the control provided by the machine. For instance, the tool can be an electrically operated tool of any one of a number of types, such as, for instance, a grinding, finishing, or polishing tool which could be utilized to exert its effect upon the work along a variable path and in variable directions during the course of the work.

Under ordinary circumstances, no holding means will be required for holding pipes or tubes being cut by gas torches of the type here illustrated, but if holding means should be desired the same can be supplied in any suitable form, such as, for instance, clamps carried by the depending posts 35 or by other means rotatable with the table 15, such as set screws extending through the template 48 as at 150. These set screws will also serve to center the work with respect to the template. Any other suitable means, such as a collar, not shown, placed inside of the template may be employed for centering the work if desired. Furthermore, if very long pipes are to be cut, such pipes can be accommodated on the machine here illustrated by removing the plate 41 and providing in its place a pipe-engaging clamp having suitable flange means supported in the same manner as the plate 41 on the adjustable table 37. In such instances, a suitable opening may be provided in the floor or other surface below the machine in the form of a well or the like for accommodating the depending ends of such pipes.

It is also possible to adjust the guide and template of this machine to accommodate pipes which extend upwardly and occupy a space entirely above the table. In such case the action is inverted and for this type of installation a center post may be provided on the table extending upwardly from the center thereof and mounted for rotation therewith. Such center post should be provided with means for supporting the upper end of the pipe whereby the same is moved in the desired manner with respect to the cutting tool. In place of a center post, the work may be mounted above the table by supporting the same on the table, properly centered with respect to the template, with the upper end thereof extending upwardly any particular distance according to the work or pipe being treated. If the work is sufficiently long, the upper end may be held by any overhead support, such as a crane or the like, by a chain or other holding means attached to the support by swivel connection. The chain will merely hold the pipe or work against falling, whereas the swivel will permit the same to be rotated as the table turns.

In addition to the foregoing, the illustrated machine can be utilized for cutting openings in pipes in connection with the manufacture of pipe intersections and junctures. This type of operation, however, will not be automatic and will not utilize all of the novel features of this invention, but nevertheless, by removing the template and guide from the table, the table and torch mechanism can be utilized for cutting holes in accordance with a procedure somewhat similar to procedures now employed for such operations.

This invention is not to be limited by the illustration here given, as other forms are contemplated and the appended claims are accordingly intended to have the broadcast possible scope permitted to them by the state of the prior art.

I claim:

1. The combination with a tool, of automatic means for moving and directing the action of said tool with respect to work to be processed by said tool, comprising a table adapted to hold said work and move the same at a predetermined speed past a vertical plane occupied by said tool, a template of predetermined shape mounted on and movable with said table, a guide of predetermined shape mounted on and movable with said table, and holding means for said tool confining the same in said vertical plane while permitting the same to freely slide bodily toward and away from said work up and down in said plane and also to freely oscillate to assume angular positions and a horizontal position in said plane, said tool being slidably mounted in said holding means and being entirely supported at spaced points and controlled in its movements by said template and guide.

2. A pipe cutting machine comprising a table adapted to hold a section of pipe and to rotate said pipe, a cutting tool, automatic means for moving and directing the action of said tool with respect to the pipe, said means comprising holding means confining the tool to movement in a plane substantially radial relative to the pipe, a template and a guide, each of predetermined shape, independently mounted upon and movable with the table, the template and guide supporting the tool and moving it within the plane defined by the holding means, the tool having means engaging the template whereby the template moves the tool radially relative to the pipe.

3. The combination with a tool, of automatic means for moving and directing the action of said tool with respect to work to be processed by said tool, comprising a table adapted to hold said work and move the same at a predetermined speed past a vertical plane occupied by said tool, a template of predetermined shape mounted on and movable with said table, and holding means for said tool confining the same in said vertical plane while permitting the same to freely slide bodily toward and away from said work, up and down in said plane and also to oscillate to assume angular positions and a horizontal position in said plane, said tool being slidably mounted in said holding means and supported at spaced points by said template and guide, respectively, said tool being provided with means having engagement with opposite faces of said template for causing the tool to move toward and away from said work as determined by the shape of said template, whereby the tool is maintained at all times in proper spaced relation to the portions of the work being processed.

4. The combination with a tool, of automatic means for moving and directing the action of said tool with respect to work to be processed by said tool, comprising a table adapted to hold said work and move the same at a predetermined speed past a vertical plane occupied by said tool, a template of predetermined shape mounted on and movable with said table, and holding means for said tool confining the same in said vertical plane while permitting the same to freely slide bodily toward and away from said work, up and down in said plane and also to oscillate to assume angular positions and a horizontal position in said plane, said tool being slidably mounted in said holding means and supported at spaced points by said template and guide, respectively, said tool being provided with means having engagement with opposite faces of said template for causing the tool to move toward and away from said work as determined by the shape of said template, whereby the tool is maintained at all times in proper spaced relation to the portions of the work being processed, the holding means for confining the tool to a vertical plane comprising a pair of spaced plates and means carried by said tool for guiding engagement with said plates.

5. A pipe cutting machine comprising a table adapted to hold a section of pipe and to rotate said pipe, a cutting tool, automatic means for moving and directing the action of said tool with respect to the pipe, said means comprising holding means confining the tool to movement in a plane substantially radial relative to the pipe, a template and a guide, each of predetermined shape, independently mounted upon and movable with the table, the template and guide supporting the tool and moving it within the plane defined by the holding means, the tool being provided with means engaging opposite faces of the template causing the tool to move toward and away from the pipe as determined by the shape of the template.

MICHAEL C. SMOTZER.